July 22, 1952

J. W. PHILLIPS 2,603,904

KITE FOR THE HEAD ROPES OF TRAWL
NETS AND SIMILAR FISHING NETS

Filed Dec. 31, 1949

INVENTOR
JOHN WILLIAM PHILLIPS
BY: Francis C Boyce
ATTORNEY.

July 22, 1952 J. W. PHILLIPS 2,603,904
KITE FOR THE HEAD ROPES OF TRAWL
NETS AND SIMILAR FISHING NETS
Filed Dec. 31, 1949 3 Sheets-Sheet 2
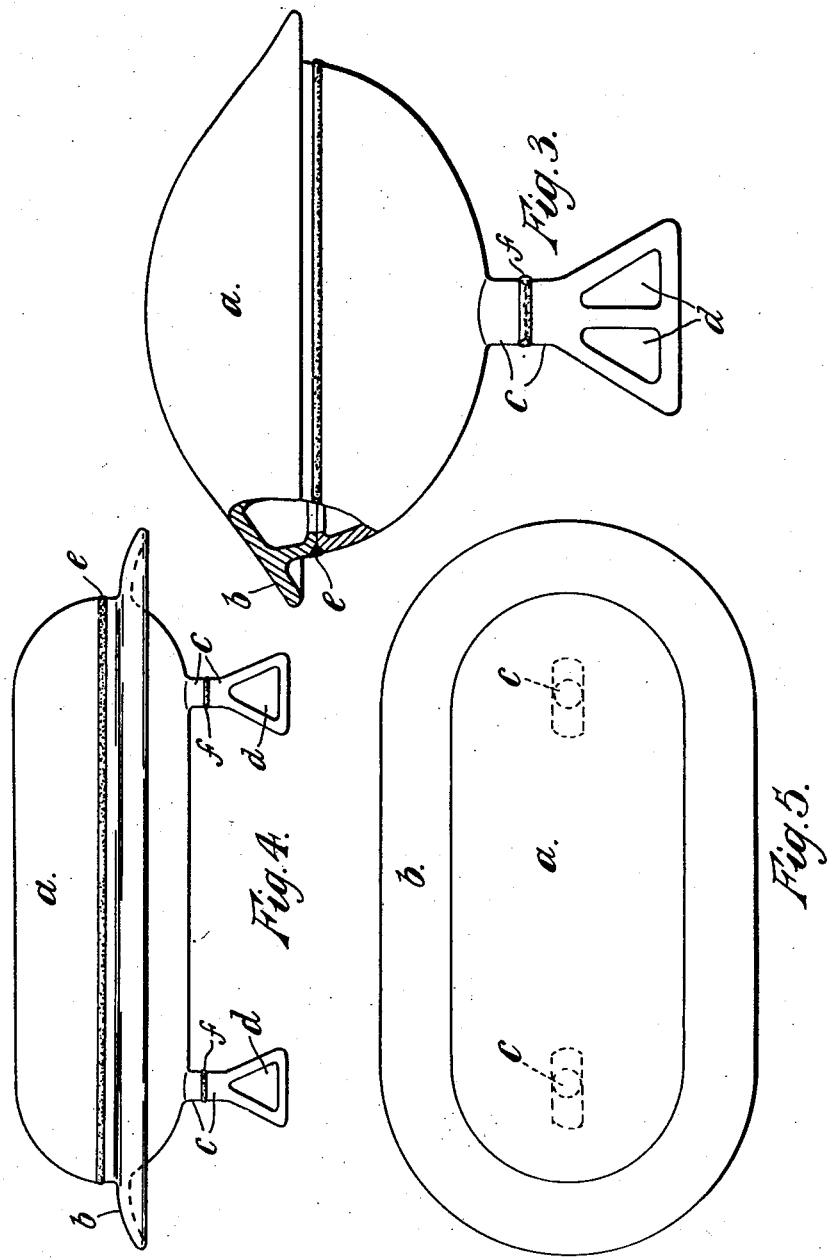
INVENTOR
JOHN WILLIAM PHILLIPS
BY: Francis E Boyce
ATTORNEY July 22, 1952 J. W. PHILLIPS 2,603,904
KITE FOR THE HEAD ROPES OF TRAWL
NETS AND SIMILAR FISHING NETS
Filed Dec. 31, 1949 3 Sheets-Sheet 3

INVENTOR
JOHN WILLIAM PHILLIPS
BY Francis E Boyce
ATTORNEY

Patented July 22, 1952

2,603,904

UNITED STATES PATENT OFFICE 2,603,904

KITE FOR THE HEAD ROPES OF TRAWL NETS AND SIMILAR FISHING NETS

John William Phillips, Osgodby, near Lincoln, England

Application December 31, 1949, Serial No. 136,202
In Great Britain February 2, 1949

16 Claims. (Cl. 43—43.1)

This invention relates to buoyant kites for sustaining the head ropes of trawl nets, and similar fishing nets, and its object is to provide a buoyant kite with means or ensuring an effective lifting action whilst the net, to which it is attached and which it buoyantly sustains, is drawn through the water.

The buoyant kite, for attachment to the head rope of a fishing net, consists of a hollow float body at least partially annularly surrounded by a fin flange and provided centrally beneath the flange with means for attachment to the head rope. According to the invention this fin flange tapers outwardly and although substantially radial is downwardly inclined and preferably downwardly curved with upper and lower surfaces merging smoothly into the hollow float body. The fin flange is preferably located around the lower portion of the hollow float body.

The attachment of the centre of the lower portion of the hollow float body to the head rope, will cause the hollow float body to tilt when drawn through the water, and thus incline the fin flange to exert a hydroplane lifting effect.

The downward inclination of the fin flange has been found to provide an improved hydroplane lifting effect, especially when the fin flange is downwardly curved.

The hollow float body could be attached by a central eye directly to the head rope. However, the tilting of the buoyant kite is promoted, if the means for attachment to the head rope, such as eyes, are provided at the end of a short lever arm or arms projecting at the centre or along the centre line of the lower portion of the hollow body.

The location of the fin flange around the lower portion of the hollow float body, exposes the fin flange, to exert a hydroplane effect, to water not yet disturbed by the dragging of the float therethrough.

The hollow float body may have a substantially circular cross section, so as to be of globular configuration or, in the case of a horizontally elongated float, of corresponding substantially cylindrical configuration, with convex or straight transverse ends.

The hollow float body may be elongated vertically.

The fin flange wholly or partially surrounds the hollow float body in a plane perpendicular to the lever arm. Preferably, this plane is offset beneath the equatorial plane of the float body.

Offsetting the flange, by locating the root of the flange away from the equatorial region of the float body, has the advantage that the mass of metal at the root of the flange is sufficiently remote from the equatorial welded joint of a float body composed of two cast cups, as not to prevent the equal heating of both interwelded surfaces.

With a horizontally elongated float, which would be attached to the bosom portion of the head rope, two or more laterally separated lever arms are provided to keep the float parallel with the head rope.

The lever arm or lever arms are located respectively at the centre of the float body or along the longitudinal centre line of a horizontally elongated float body.

Representative examples of buoyant kites are shown in the accompanying drawings, in which:

Fig. 3 is an elevation, partly in section, of a globular buoyant kite with a downwardly inclined flange, offset relatively to and above an equatorial welded joint.

On a smaller scale:

Fig. 4 is an elevation, and

Figure 1:
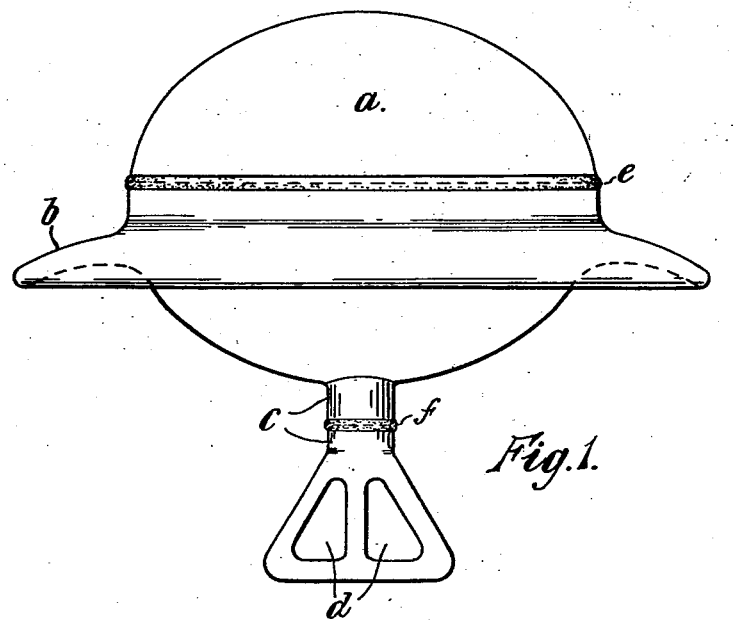
Fig. 1 is an elevation.

Fig. 5 is a plan of a horizontally elongated buoyant kite similar to the globular kite shown in Fig. 1.

Figure 6:
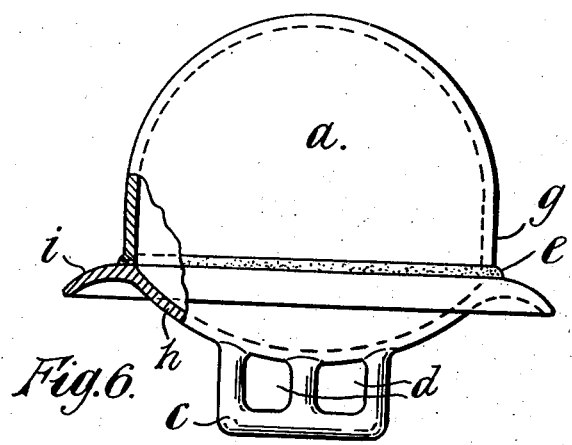
Figure 7:
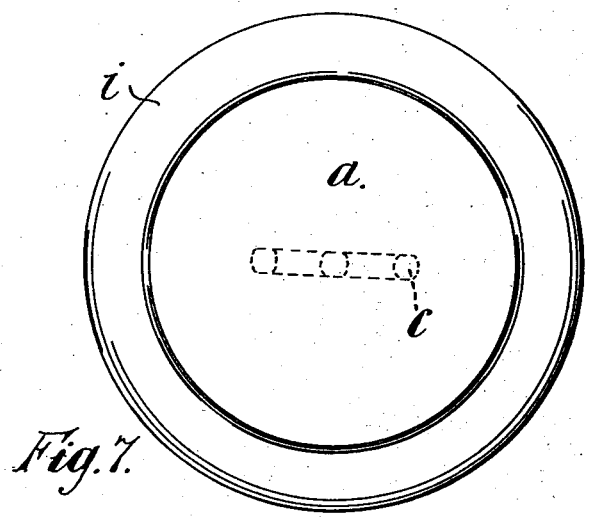
Figure 8:
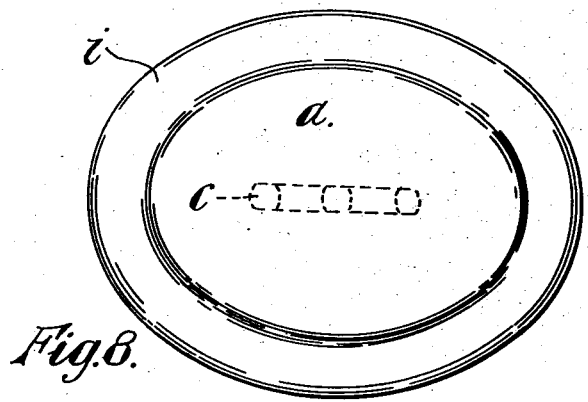

Fig. 6 is an elevation, partly in section, of a vertically elongated buoyant kite, and Figs. 7 and 8 are alternative plans thereof.

Figure 2:
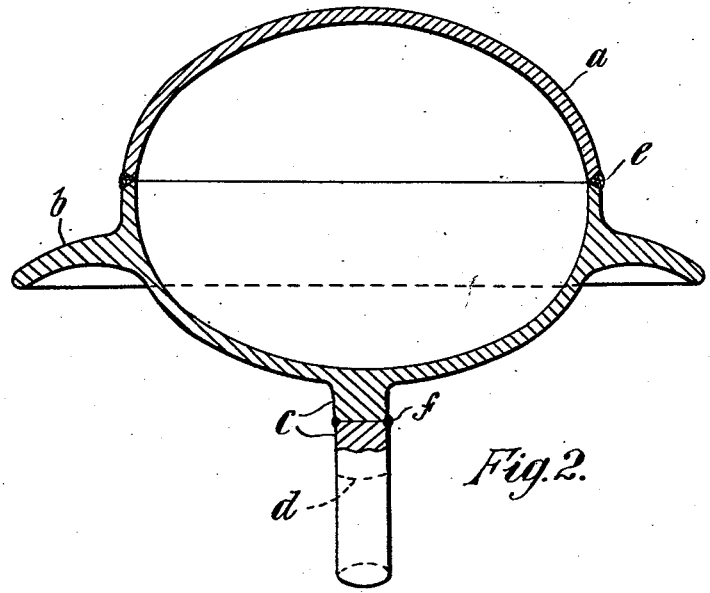
Fig. 2 is a transverse section of a globular buoyant kite with a downwardly curving flange, offset relatively to and beneath an equatorial welded joint.

Referring more particularly to Figs. 1 and 2, $a$ is a globular hollow body provided with a narrow annular flange $b$.

Centrally beneath the flange $b$, the flanged body $a$ is provided with a lever arm $c$, projecting perpendicularly to the flange $b$ and terminating in an eye $d$.

Such a buoyant kite is attached to the head rope at the wings of the trawl net, but can be attached to the head rope at the bosom of the net.

However, along the bosom of the net, an oval or a rectangular buoyant kite as shown in Figs. 4 and 5 can be attached to the head rope. With such a horizontally elongated buoyant kite, two lever arms $c$ with eyes $d$ are provided equidistantly from the ends along the longitudinal axis of the elongated buoyant kite.

The lever arm $c$ whilst sufficiently long to tilt the buoyant kite sufficiently when dragged by the head rope, should be of such restricted length as not to project unduly and be liable to be easily damaged on deck and when shooting the trawl or hauling it inboard, as the kites are liable to be subjected to rough usage by impact with steel foot rope rollers, called bobbins.

The flanged hollow buoyant kites are preferably formed of two interwelded cast, for instance die cast, cups of seawater-resistant aluminium alloy. The buoyant kites however may be formed of interwelded cast or pressed sheet steel hardened by heat treatment, or sheet aluminium alloy, cups. Alternatively they may be synthetic resin castings.

The buoyant kite shown in Figs. 1 and 2 has an almost spherical globular body $a$ and an outwardly tapering annular flange $b$. The flange $b$ of this buoyant kite although substantially radial curves downwardly, and is offset beneath an equatorial welded joint $e$.

As will be seen in the drawings, the upper and lower surfaces of the flange $b$ merge smoothly into the globular body $a$.

To permit the lower portion of the body $a$ of this kite to be withdrawn from the mould in which it is cast, the lower eyed portion of the lever arm $c$ can, as shown, be cast separately, and subsequently connected to the stem of the arm $c$ by a welded joint $f$ or other joint.

Instead of the downwardly inclined flange $b$ being offset beneath the equatorial welded joint $e$, the flange $b$ can be offset above the weld $e$ as shown in Fig. 3. This locates the edge of the flange $b$ near the equatorial plane of the float body $a$, whilst keeping the mass of metal at the root of the flange $b$ sufficiently remote from the weld $e$, not to interfere with the equal heating of the metal on both sides of the joint during welding.

Figs. 4 and 5 show a buoyant kite similar to that shown in Figs. 1 and 2 constructed as a horizontally elongated kite with two lever arms $c$, for attachment to the bosom portion of a head rope of a net, located along the major axis thereof.

The flange $b$ may be interrupted and extend around only portions of the hollow body $a$.

The hollow body $a$ of the buoyant kite, instead of being spherically globular as shown in Figs. 1, 2 and 3, can be elongated vertically so as to be of barrel configuration with its axis upright. Such an upright barrel-shaped buoyant kite is shown in Fig. 6. In this construction the domed upper cup of the body $a$ is extended downwards by a skirt $g$, which is closed at the bottom by a domed cap $h$. This domed cap $h$ extends peripherally beyond the skirt $g$ of the hollow body $a$, to provide a downwardly recurved annular flange $i$ to constitute the outwardly tapering annular fin flange. The lever handle $c$, with eyes $d$, is cast on or welded to the recurved domed cap $h$.

The skirt $g$ can be cylindrical and the fin flange $i$ circular as shown in plan in Fig. 7, or oval as shown in plan in Fig. 8.

I claim:
1. A buoyant kite for attachment to the head rope of a fishing net, consisting of a hollow float body, a substantially radial but downwardly inclined outwardly tapering fin flange on and merging smoothly into and at least partially surrounding said float body, and means on said float body for attachment to the head rope medianly beneath said flange.

2. A buoyant kite for attachment to the head rope of a fishing net, consisting of a hollow float body, a substantially radial but downwardly curved outwardly tapering fin flange on and merging smoothly into and at least partially surrounding said float body, and means on said float body for attachment to the head rope medianly beneath said flange.

3. A buoyant kite for attachment to the head rope of a fishing net, consisting of a hollow float body, a substantially radial but downwardly inclined outwardly tapering fin flange on and merging smoothly into and at least partially surrounding the lower portion of said float body, and means on said float body for attachment to the head rope medianly beneath said flange.

4. A buoyant kite for attachment to the head rope of a fishing net, consisting of a hollow float body, a substantially radial but downwardly curved outwardly tapering fin flange on and merging smoothly into and at least partially surrounding the lower portion of said float body, and means on said float body for attachment to the head rope medianly beneath said flange.

5. A buoyant kite for attachment to the head rope of a fishing net, consisting of a substantially spherically globular hollow float body, a substantially radial but downwardly inclined outwardly tapering fin flange on and merging smoothly into and at least partially surrounding said float body, and means on said float body for attachment to the head rope medianly beneath said flange.

6. A buoyant kite for attachment to the head rope of a fishing net, consisting of a substantially spherically globular hollow float body, a substantially radial but downwardly curved outwardly tapering fin flange on and at least partially surrounding said float body, and merging smoothly into and means on said float body for attachment to the head rope medianly beneath said flange.

7. A buoyant kite for attachment to the head rope of a fishing net, consisting of a substantially spherically globular hollow float body, a substantially radial but downwardly inclined outwardly tapering fin flange on and merging smoothly into and at least partially surrounding the lower portion of said float body, and means on said float body for attachment to the head rope medianly beneath said flange.

8. A buoyant kite for attachment to the head rope of a fishing net, consisting of a substantially spherically globular hollow float body, a substantially radial but downwardly curved outwardly tapering fin flange on and merging smoothly into and at least partially surrounding the lower portion of said float body, and means on said float body for attachment to the head rope medianly beneath said flange.

9. A buoyant kite for attachment to the head rope of a fishing net, consisting of a substantially spherically globular hollow float body, a substantially radial but downwardly inclined outwardly tapering fin flange on and merging smoothly into and at least partially surrounding said float body, and a short lever arm on said float body terminating in means for attachment to the head rope medianly beneath and perpendicular to said flange.

10. A buoyant kite for attachment to the head rope of a fishing net, consisting of a substantially spherically globular hollow float body, a substantially radial but downwardly curved outwardly tapering fin flange on and merging smoothly into and at least partially surrounding said float body, and a short lever arm on said float body terminating in means for attachment to the head rope medianly beneath and perpendicular to said flange.

11. A buoyant kite for attachment to the head rope of a fishing net, consisting of a substantially spherically globular hollow float body, a substantially radial but downwardly inclined outwardly tapering fin flange on and merging smoothly into and at least partially surrounding the lower portion of said float body, and a short lever arm on said float body terminating in means for attachment to the head rope medianly beneath and perpendicular to said flange.

12. A buoyant kite for attachment to the head rope of a fishing net, consisting of a substantially spherically globular hollow float body, a substantially radial but downwardly curved outwardly tapering fin flange on and merging smoothly into and at least partially surrounding the lower portion of said float body, and a short lever arm on said body float terminating in means for attachment to the head rope medianly beneath and perpendicular to said flange.

13. A buoyant kite for attachment to the head rope of a fishing net, consisting of a horizontally elongated hollow float body, a substantially radial but downwardly inclined outwardly tapering fin flange surrounding and merging smoothly into the lower portion of said float body, and means for attachment to the head rope on and along the major axis of said float body beneath said flange.

14. A buoyant kite for attachment to the head rope of a fishing net, consisting of a horizontally elongated hollow float body, a substantially radial but downwardly curved outwardly tapering fin flange surrounding and merging smoothly into the lower portion of said float body, and means for attachment to the head rope on and along the major axis of said float body beneath said flange.

15. A buoyant kite for attachment to the head rope of a fishing net, consisting of a horizontally elongated hollow float body, a substantially radial but downwardly inclined outwardly tapering fin flange surrounding and merging smoothly into the lower portion of said float body, and short lever arms terminating in means for attachment to the head rope on and along the major axis of said float body beneath and perpendicular to said flange.

16. A buoyant kite for attachment to the head rope of a fishing net, consisting of a horizontally elongated hollow float body, a substantially radial but downwardy curved outwardly tapering fin flange surrounding and merging smoothly into the lower portion of said float body, and short lever arms terminating in means for attachment to the head rope on and along the major axis of said float body beneath and perpendicular to said flange.

JOHN WILLIAM PHILLIPS.

REFERENCES CITED

The following references are of record in the file of this patent:

UNITED STATES PATENTS

| Number | Name | Date |
|---|---|---|
| 612,109 | Hutchins | Oct. 11, 1898 |
| 2,110,596 | Gaede | Mar. 8, 1938 |

FOREIGN PATENTS

| Number | Country | Date |
|---|---|---|
| 17,562 | Sweden | May 7, 1904 |
| 537,726 | Great Britain | July 3, 1941 |